(12) United States Patent
Li et al.

(10) Patent No.: US 11,695,600 B2
(45) Date of Patent: Jul. 4, 2023

(54) COSTAS SEQUENCE TIME-FREQUENCY SYNCHRONIZATION METHOD BASED ON ALL-PHASE SPECTRUM CORRECTION (71) Applicant: CHONGQING UNIVERSITY OF POSTS AND TELECOMMUNICATIONS, Chongqing (CN)

(72) Inventors: Guojun Li, Chongqing (CN); Jinghui Li, Chongqing (CN); Changrong Ye, Chongqing (CN); Huan Ma, Chongqing (CN); Guangfa Zheng, Chongqing (CN); Yiping Luo, Chongqing (CN); Zunli Wang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 17/919,769

(22) PCT Filed: Feb. 2, 2021

(86) PCT No.: PCT/CN2021/074784
§ 371 (c)(1),
(2) Date: Oct. 19, 2022

(87) PCT Pub. No.: WO2022/134273
PCT Pub. Date: Jun. 30, 2022

(65) Prior Publication Data
US 2023/0179456 A1 Jun. 8, 2023

(30) Foreign Application Priority Data
Dec. 23, 2020 (CN) .......................... 202011532813.7

(51) Int. Cl.
H04L 27/00 (2006.01)
H04L 7/00 (2006.01)
H04L 27/10 (2006.01)

(52) U.S. Cl.
CPC ........ *H04L 27/0014* (2013.01); *H04L 7/0054* (2013.01); *H04L 27/106* (2013.01)

(58) Field of Classification Search
CPC combination set(s) only.
See application file for complete search history.

(56) References Cited

U.S. PATENT DOCUMENTS 5,808,580 A * 9/1998 Andrews, Jr. ......... G01S 13/582
367/90
7,444,128 B1 10/2008 Nelson
(Continued)

FOREIGN PATENT DOCUMENTS

CN 1438777 A 8/2003
CN 102215205 A 10/2011
(Continued)

OTHER PUBLICATIONS

International Search Report for PCT/CN2021/074784 dated Sep. 22, 2022, ISA/CN.

*Primary Examiner* — Sung S Ahn
(74) *Attorney, Agent, or Firm* — Yue (Robert) Xu; Apex Attorneys at Law, LLP (57) ABSTRACT The present invention relates to the field of digital signal processing, and in particular to a Costas sequence time-frequency joint synchronization method based on all-phase spectrum correction. The method improves the defects existing in a discrete frequency spectrum correction algorithm using short-time Fourier transform and sliding correlation. The improvement mainly comprises: the present disclosure provides a solution based on iterative optimization: when an actual frequency offset is an integral multiple of the spectral
(Continued)

resolution, a large error can occur, frequency offset correction and time delay correction are carried out on a signal by using an estimated value having a large estimated error, then estimation is carried out again, and the frequency offset of the signal is not a special value by means of an iteration mode.

3 Claims, 4 Drawing Sheets

(56) References Cited

U.S. PATENT DOCUMENTS

| | | | |
|---|---|---|---|
| 9,473,332 B2* | 10/2016 | Bajcsy | H04L 27/2654 |
| 2005/0169165 A1* | 8/2005 | Cimini, Jr. | H04L 27/2662 |
| | | | 370/206 |
| 2016/0294504 A1 | 10/2016 | Ureten et al. | |

FOREIGN PATENT DOCUMENTS

| | | | |
|---|---|---|---|
| CN | 102638319 A | 8/2012 | |
| CN | 102694763 A | 9/2012 | |

* cited by examiner

COSTAS SEQUENCE TIME-FREQUENCY SYNCHRONIZATION METHOD BASED ON ALL-PHASE SPECTRUM CORRECTION

The present application is the national phase of International Patent Application No. PCT/CN2021/074784, titled "COSTAS SEQUENCE TIME-FREQUENCY SYNCHRONIZATION METHOD BASED ON ALL-PHASE SPECTRUM CORRECTION", filed on Feb. 2, 2021, which claims the priorities to Chinese Patent Application No. 202011532813.7, titled "COSTAS SEQUENCE TIME-FREQUENCY SYNCHRONIZATION METHOD BASED ON ALL-PHASE SPECTRUM CORRECTION", filed on Dec. 23, 2020 with the China National Intellectual Property Administration, both of which are incorporated herein by reference in their entireties.

FIELD

The present disclosure relates to the field of digital signal processing, and in particular to a time-frequency joint synchronization method based on an all-phase spectrum-corrected Costas sequence.

BACKGROUND

Short-wave MFSK communication is widely used in low-rate and minimum-guaranteed application scenarios. For a communication system, a signal is received based on detecting the signal and synchronizing a receiver and a transmitter. The synchronization performance directly affects the performance of the communication system. Synchronization errors or loss of synchronization may result in degraded performance of the communication system or communication interruptions.

In a short-wave MFSK communication system, a data-assisted synchronization algorithm is commonly used for signal synchronization. With the data-assisted synchronization algorithm, a training sequence is inserted into a data sequence, and then a receiver searches for the training sequence in the data sequence by using a local sequence for synchronization. The commonly used training sequences include a pseudo-random sequence with good autocorrelation. The commonly used synchronization algorithm includes a sliding correlation method and the like. Since the Costas sequence has excellent two-dimensional autocorrelation properties in representation of two-dimensional matrices, a Costas sequence is used as a synchronization sequence in a short-wave MFSK communication time-frequency synchronization algorithm based on a Costas sequence. A time domain signal is processed into a time-frequency spectrum by using a short-time Fourier transform, and a two-dimensional sliding correlation is performed by using the Costas sequence as the local sequence. Benefiting from the excellent autocorrelation properties of the two-dimensional matrix of the Costas sequence, the above synchronization algorithm has excellent anti-noise performance and anti-frequency offset performance. In the short-wave MFSK communication time-frequency synchronization algorithm based on the Costas sequence, the accuracy of the frequency synchronization is limited by a spectrum resolution, and the accuracy of the time synchronization is limited by a time period of a symbol. Therefore, the accuracy of the frequency estimation may be improved by performing oversampling operation, and the accuracy of the time synchronization may be improved by changing a step length of a window function in the short-time Fourier transform. In addition, a discrete spectral analysis algorithm may be used to improve estimation accuracy. However, due to two problems existing in the use of the discrete spectrum analysis algorithm, an optimal estimation accuracy of the short-wave MFSK communication time-frequency synchronization algorithm based on the Costas sequence cannot be achieved. The problems are described as follows.

(1) In a case that an actual frequency offset f (which may be 0, that is, there is no frequency offset) is an integer multiple of the spectrum resolution, a large error occurs. In a case that there is no frequency offset and no noise interference, it is assumed that a spectrum line of a peak after DFT should be at a position x, then the spectrum line at the position x, that is, at the peak, is a correct frequency position, the spectrum line of the peak has a value of 0 respectively at positions of x−1 and x+1, and a correct frequency offset may be estimated by using a gravity-center algorithm. However, due to the interference of noise, the values at the positions of x−1 and x+1 are not 0, resulting in a large error in the discrete spectrum analysis algorithm.

(2) A time delay is not considered in the above analysis, and the influence caused by the time delay is analyzed hereinafter. In a case that there is a time delay in a signal, a sampled signal includes a signal containing only noise. In this case, performing short-time Fourier transform with a window function having a time period equal to a time period of a single symbol may cause some information of a current symbol is included in a time period of a next symbol. For an MFSK signal, in a case that two symbols have a small frequency interval, the spectrum line of the main lobe used in the discrete spectrum analysis algorithm is seriously interfered due to the influence of spectrum leakage, resulting in a large error.

In summary, although the short-wave MFSK communication time-frequency synchronization algorithm based on a Costas sequence has high estimation accuracy, the algorithm can be further improved. With the improvement of the spectrum correction algorithm, the synchronization accuracy of the algorithm can be further improved.

SUMMARY

In order to solve the above problems, a time-frequency joint synchronization method based on an all-phase spectrum-corrected Costas sequence is provided according to the present disclosure.

A time-frequency joint synchronization method based on an all-phase spectrum-corrected Costas sequence includes the following steps:

S1, dividing, by a receiver after receiving a time-domain signal x(N), the time-domain signal x(N) to obtain divided signals $x_1(n), x_2(n), \ldots,$ and $x_m(n)$ based on a time period of a symbol, where the divided signals are represented by $x_i(n)$, i=1, 2, ..., m, and m represents the number of the divided signals;

S2, inverting the $x_i(n)$, windowing the inverted $x_i(n)$, performing an all-phase Fourier transform apFFT on the windowed $x_i(n)$ to obtain all-phase Fourier transforms $X_i(W)$ to $X_m(W)$ of the divided signals $x_i(n)$, and performing modulus calculation to obtain spectrums $|X_i(W)|^2$ to $|X_m(W)|^2$ of the divided signals $x_i(n)$, where the spectrums are represented by $|X_i(W)|^2$;

S3, combining the spectrums $|X_i(W)|^2$ to $|X_m(W)|^2$ of the divided signals into a time-frequency spectrum, and expressing the combined time-frequency spectrum as a time-frequency matrix S4, performing sliding autocorrelation on a local Costas sequence based on the time-frequency matrix by using a sliding window algorithm to obtain a two-dimensional autocorrelation function, obtaining a coarse synchronization result (that is, a coarse time delay estimation value and a coarse frequency offset estimation value) based on coordinates of a peak of the autocorrelation function, and correcting a discrete spectrum after all-phase Fourier transform based on a coarse estimation value to obtain a time delay estimation value and a frequency offset estimation value;

S5, determining whether an amplitude of the peak of the two-dimensional autocorrelation function in the S4 is decreased compared with an amplitude of a peak of a two-dimensional autocorrelation function in S4 in a previous iteration or whether the number of iterations reaches a maximum limit, outputting a time delay estimation value and a frequency offset estimation value in the S4 in the previous iteration as an output result of the method in a case that the amplitude of the peak of the two-dimensional autocorrelation function is decreased or the number of the iterations reaches the maximum limit, and increasing the number of iterations by one and proceeding to S6 in a case that the amplitude of the peak of the two-dimensional autocorrelation function is not decreased; and S6, performing time delay correction and frequency offset correction on the time-domain signal x(N) in S1 by using the time delay estimation value and the frequency offset estimation value obtained in S4 as correction values to obtain a corrected time-domain signal x(N), and proceeding to S1.

In an embodiment, step S4 includes:

S41, performing two-dimensional autocorrelation on the local Costas sequence based on the time-frequency matrix obtained in S3 to obtain the two-dimensional autocorrelation function, determining an abscissa of the peak of the two-dimensional autocorrelation function as a coarse time delay estimation value, and determining an ordinate of the peak as a coarse frequency offset estimation value; and S42, based on the coarse time delay estimation value, performing discrete spectrum analysis on a spectrum in a time period of a symbol (determined based on the coarse time delay estimation value) corresponding to the coarse time delay estimation value to obtain coordinates of a peak of the spectrum, and performing coarse frequency estimation by using a gravity-center algorithm and a main lobe function expression of a used window function to obtain the time delay estimation value and the frequency offset estimation value.

In an embodiment, the time delay correction and the frequency offset correction are performed on the time-domain signal x(N) in S6 by using the following correction equation:

$$x(n)=x(n+t_{es})\cdot e^{-j2\pi\Delta ft}$$

where x(n) represents the corrected time-domain signal, $t_{es}$ represents a coarse time delay estimation value, and $\Delta f$ represents the frequency offset estimation value.

The present disclosure has the following advantageous effects.

1. In the method according to the present disclosure, the short-time Fourier transform STFT used in the conventional method is replaced by the all-phase Fourier transform. With the apFFT, the spectrum leakage and mutual interference of adjacent symbols caused by the time delay in the MFSK signal can be reduced, thereby effectively avoiding the subsequent problem of large discrete spectrum analysis errors caused by the spectrum leakage and the mutual interference.

2. The conventional time-frequency joint synchronization method based on a Costas sequence is based on a short-time Fourier transform, and the spectrum resolution is generally improved by performing oversampling operation, resulting in an increased value of N in an equation and thereby reducing the anti-noise performance of the method. Further, in a case that an actual frequency offset f is an integer multiple of the spectrum resolution, a large error occurs. With the method according to the present disclosure, frequency offset correction and time delay correction is performed on the error through iterations.

BRIEF DESCRIPTION OF THE DRAWINGS

The present disclosure will be described in further detail hereinafter with reference to the accompanying drawings and specific embodiments.

DETAILED DESCRIPTION OF THE EMBODIMENTS

The technical solutions in the embodiments of the present disclosure will be clearly and completely described hereinafter with reference to the accompanying drawings in the embodiments of the present disclosure. Apparently, the described embodiments are only a part of the embodiments of the present disclosure, but not all of the embodiments. Based on the embodiments of the present disclosure, all other embodiments obtained by those skilled in the art without creative efforts shall fall within the protection scope of the present disclosure.

For the problem of estimation accuracy of the short-wave MFSK communication time-frequency synchronization algorithm based on a Costas sequence, the method according to the embodiments of the present disclosure, improving the accuracy of the discrete spectrum correction algorithm. The improvements mainly include improving the short-wave MFSK communication time-frequency synchronization algorithm based on a Costas sequence by using apFFT and improving the discrete spectrum correction algorithm based on iterative optimization.

First Embodiment

Figure 1:
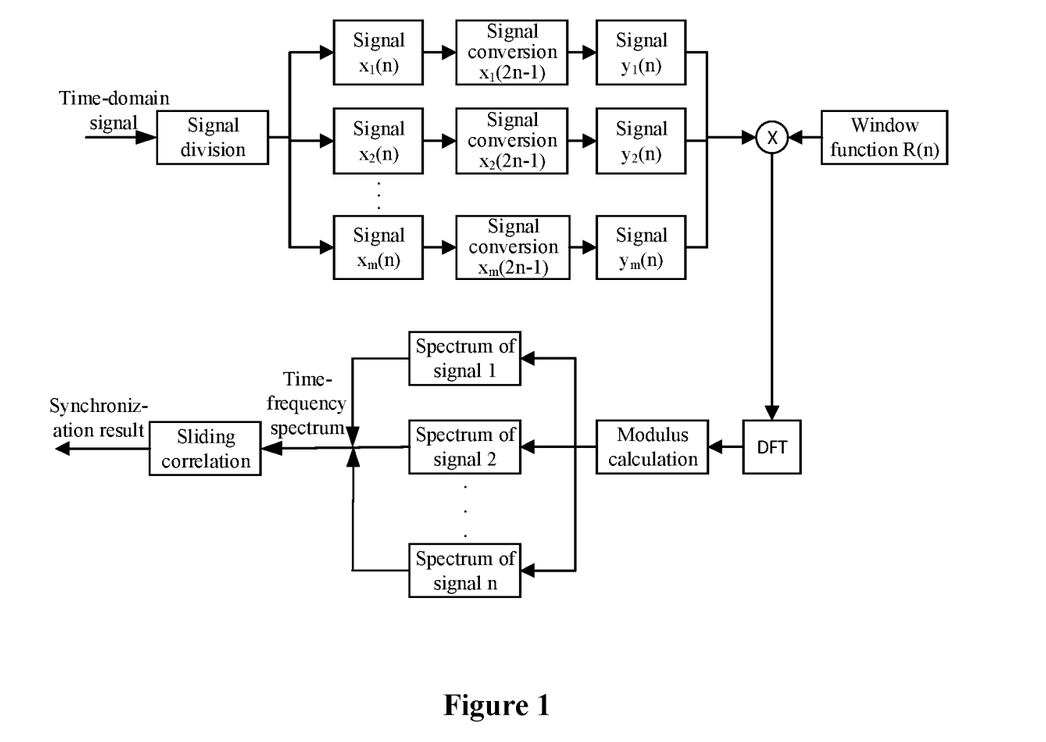
FIG. 1 is a flow chart of a time-frequency joint synchronization algorithm based on apFFT according to an embodiment of the present disclosure.
Figure 2:
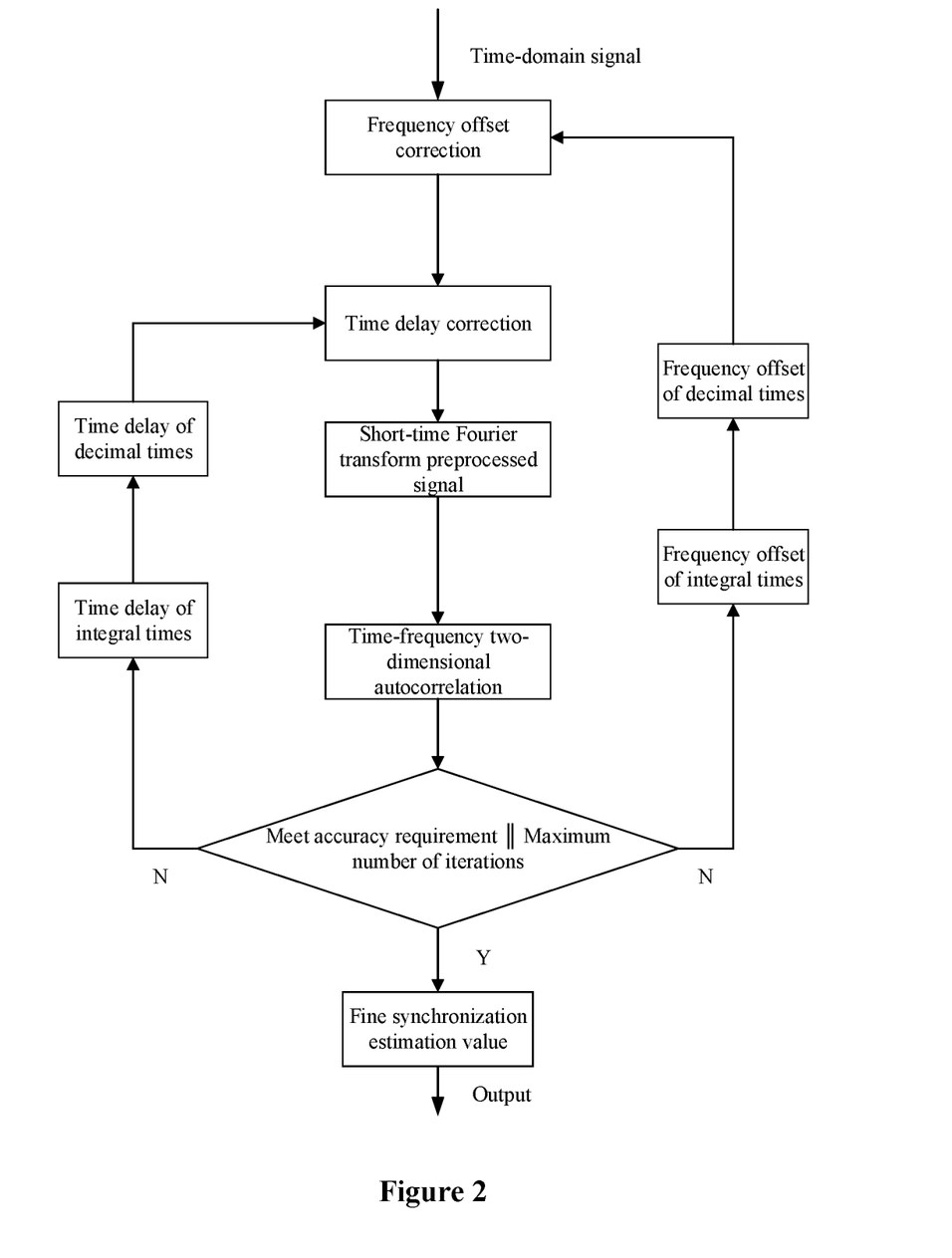
FIG. 2 is a flow chart of a discrete spectrum correction algorithm based on iterative optimization according to an embodiment of the present disclosure.

A time-frequency joint synchronization method based on an all-phase spectrum-corrected Costas sequence is provided according to an embodiment of the present disclosure. As shown in FIGS. 1 and 2, in a preferred embodiment, the method includes the following steps S1 to S6.

In step S1, after receiving a time-domain signal x(N), a receiver performs signal division on the time-domain signal x(N) based on a time period of a symbol. The time-domain signal x(N) is divided into m time-domain signals representing symbol information. Divided signals $x_1(n)$, $x_2(n)$, ..., and $x_m(n)$ are obtained, which are abbreviated as divided signals $x_i(n)$, where i=1, 2, ..., m, and m represents the number of the divided signals.

In step S2, the $x_i(n)$ is inverted, the inverted $x_i(n)$ is windowed, an apFFT is performed on the windowed $x_i(n)$ to obtain all-phase Fourier transforms $X_1(W)$ to $X_m(W)$ of the divided signals $x_i(n)$, and modulus calculation is performed to obtain spectrums $|X_1(W)|^2$ to $|X_m(W)|^2$ of the divided signals $x_i(n)$. The spectrums are represented by $|X_i(W)|^2$.

Specifically, in step S2, the divided signals $x_i(n)$ are duplicated and inverted, and then are combined with the signals $x_i(n)$ to obtain a signal $x_i(2n-1)$.

Then, the combined signal $x_i(2n-1)$ is weighted by using a convolution window w, and data with an interval of N are overlapped and added to obtain a signal $y_i(n)$. N represents a length of the digital signal.

Windowed DFT is performed on the signal $y_i(n)$ to perform the all-phase Fourier transform operation, and the all-phase Fourier transforms $X_1(W)$ to $X_m(W)$ of the divided signals $x_i(n)$ are obtained. Then, modulus calculation is performed based on the signal $y_i(n)$ after performing the windowed DFT. After the modulus calculation based on the signal $y_i(n)$, the spectrums $|X_1(W)|^2$ to $|X_m(W)|^2$ of the divided signals $x_1(n)$ to $x_m(n)$ are obtained. The spectrum of the signal $x_i(n)$ is represented by $|X_i(W)|^2$.

In the step S2, after dividing the time-domain signal based on the time period of the symbol, the all-phase Fourier transform is performed on each of the divided time-domain signals to obtain a spectrum of each of the time-domain signals, and then the spectrum of each of the time-domain signals are combined to obtained the spectrum of the signal x(N). With this step, the following advantageous effects can be achieved. In order to reduce the influence of spectrum leakage, the FFT process in the conventional short-time Fourier transform (STFT) is replaced by the all-phase Fourier transform. With the apFFT, the spectrum leakage and mutual interference of adjacent symbols caused by the time delay in the MFSK signal can be reduced, thereby effectively avoiding the subsequent problem of large discrete spectrum analysis errors caused by the spectrum leakage and the mutual interference.

In step S3, the spectrums $|X_1(W)|^2$ to $|X_m(W)|^2$ of the divided signals $x_i(n)$ are combined into a time-frequency spectrum to obtain the combined time-frequency spectrum, and the combined time-frequency spectrum is expressed by using a time-frequency matrix.

In step S4, sliding autocorrelation is performed on a local Costas sequence based on the time-frequency matrix by using a sliding window algorithm, and a coarse synchronization result is obtained based on coordinates of a peak of an autocorrelation function. Specifically, two-dimensional autocorrelation is performed on the local Costas sequence based on the time-frequency matrix obtained in step S3 to obtain a two-dimensional autocorrelation function. An abscissa of the peak of the two-dimensional autocorrelation function is determined as a coarse time delay estimation value $t_{es}$, and an ordinate of the peak of the two-dimensional autocorrelation function is determined as a coarse frequency offset estimation value.

Figure 4:
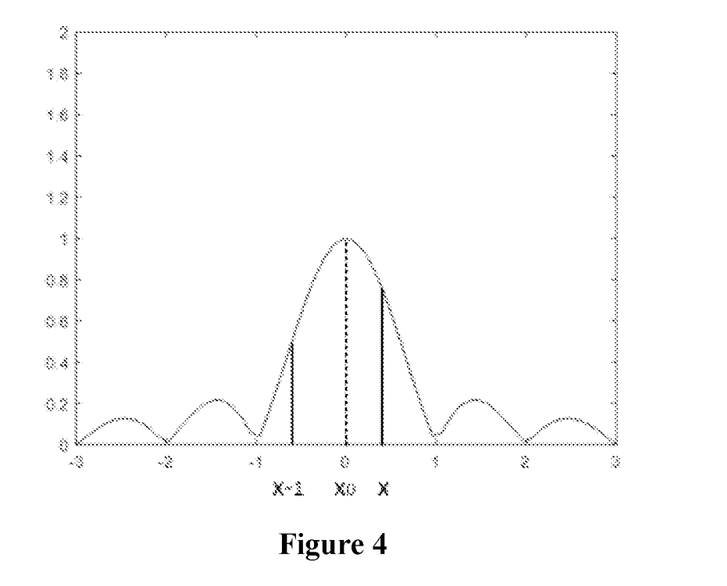
FIG. 4 is a schematic diagram 1 showing discrete spectrum correction according to an embodiment of the present disclosure.

Due to the influence of the frequency offset f, x represents the position of the peak of the spectrum after apFFT transformation. As shown in FIG. 4, $x_0$ represents the position of the actual peak of the spectrum, and x represents the position of the peak of the spectrum after apFFT transformation. Therefore, an error occurs in the above processing of determining the ordinate of the peak as the coarse frequency offset estimation value. It is required to further correct the frequency offset to obtain the frequency offset estimation value after correcting the coarse frequency offset estimation value. Specifically, based on the coarse time delay estimation value, discrete spectrum analysis is performed on a spectrum in a time period of a symbol corresponding to $t_{es}$ to obtain coordinates of a peak of the spectrum, and frequency estimation is performed by using a gravity-center algorithm and a main lobe function expression of a used window function to obtain the frequency offset estimation value $\Delta f$. In this Step, the time delay estimation value $t_{es}$ and the frequency offset estimation value $\Delta f$ are obtained.

In step S5, it is determined whether an amplitude of the peak of the two-dimensional autocorrelation function in step S4 is reduced compared with an amplitude of a peak of a two-dimensional autocorrelation function in S4 in a previous iteration (if the current iteration is a first iteration, the amplitude of the peak of the two-dimensional autocorrelation function in the previous iteration is 0 by default) or whether the number of iterations reaches a maximum limit. In a case that the amplitude of the peak of the two-dimensional autocorrelation function is reduced or the number of iterations reaches the maximum limit, a time delay estimation value and a frequency offset estimation value in the S4 in the previous iteration are outputted as an output result of the method. In a case that the amplitude of the peak of the two-dimensional autocorrelation function is not reduced, the number of iterations is increased by one, and proceed to step S6.

Specifically, the two-dimensional autocorrelation function is obtained in step S1, and comparison is performed based on a Max value of the magnitude of the two-dimensional autocorrelation function in the current iteration, where the Max value of the magnitude of the two-dimensional autocorrelation function in the current iteration is defined as $Max_i$, and i represents the number of iterations. $Max_i$ is compared with $Max_{i-1}$ (if step S2 is performed for the first time, $Max_{i-1}$ is 0 by default, that is, $Max_1$ is 0 by default). In a case that the amplitude of the peak of the two-dimensional autocorrelation function in the current iteration is reduced compared with the amplitude of the peak of the two-dimensional autocorrelation function in the previous iteration, that is, $Max_i > Max_{i-1}$, it indicates that the position of the spectrum line of the peak in the current iteration is closer to a position of a spectrum line of a real peak than the position of the spectrum line of the peak in the previous iteration, and the energy of the peak in the current iteration is larger than the energy of the peak in the previous iteration, that is, a positive effect is achieved by performing the frequency offset correction. Therefore, the number of iterations is increased by one, and subsequent step S6 is performed. In a case that the amplitude of the peak of the two-dimensional autocorrelation function in the current iteration is not reduced compared with the amplitude of the peak of the two-dimensional autocorrelation function in the previous iteration, that is, $Max_i <= Max_{i-1}$, it indicates that the position of the spectrum line of the peak in the current iteration is farther away from a position of a spectrum line of a real peak than the position of the spectrum line of the peak in the previous iteration, and the energy of the peak in the current iteration is less than the energy of the peak in the previous iteration, that is, a negative effect is achieved by performing the frequency offset correction. Therefore, the iteration should be stopped in time to prevent achieving a positive effect in the next iteration and prevent infinite iteration to a maximum iteration number. The influence of time delay $\tau - t_{es}$ on $Max_i$ is the same as the influence of frequency offset f−Δf on $Max_i$. Therefore, in the case that $Max_i <= Max_{i-1}$, the iteration is stopped, and the time delay estimation value $t_{es}$ and the frequency offset estimation value Δf obtained in step S4 in the previous iteration are outputted as a final estimation result.

In the embodiment, it is determined whether to stop the iteration based on the peaks of the autocorrelation functions in two adjacent iterations. The Max value of the magnitude of the two-dimensional autocorrelation function in the current iteration is defined as $Max_i$, where i represents the number of iterations. $Max_i$ is compared with $Max_{i-1}$. In the case that $Max_i > Max_{i-1}$, iteration is performed to improve the accuracy of the method. In the case that $Max_i <= Max_{i-1}$, it indicates that the position of the spectrum line of the peak in the current iteration is farther away from a position of a spectrum line of a real peak than the position of the spectrum line of the peak in the previous iteration, and the energy of the peak in the current iteration is less than the energy of the peak in the previous iteration, that is, a negative effect is achieved by performing the frequency offset correction, thus the iteration should be stopped and the result is outputted. In the method, the result in the penultimate iteration is outputted as an output result, ensuring the accuracy of the method.

In step S6, time delay correction and frequency offset correction are performed on the time-domain signal x(N) in step S1 by using time delay estimation value $t_{es}$ and the frequency offset estimation value Δf obtained in step S4 as correction values to obtain a corrected time-domain signal x(N), and steps S1 to S5 are performed based on the corrected time-domain signal x(N).

With the method according to the present disclosure, the large error caused in the case that the frequency offset is an integer multiple of the spectrum resolution in the discrete spectrum analysis is solved by performing iterations. In each of the iterations, the original signal is corrected based on an estimation value (regardless of the actual accuracy). Through continuous correction, a probability of the frequency offset being a certain value is reduced, thereby achieving an optimal estimation accuracy of the discrete spectrum analysis algorithm.

In summary, with the time-frequency joint synchronization method based on an all-phase spectrum-corrected Costas sequence according to the present disclosure, the problem of periodic synchronization accuracy of the time-frequency joint synchronization algorithm can be effectively improved, and the anti-noise performance of the algorithm can be further improved.

Second Embodiment

In the embodiment, it is assumed that T represents a time period of a symbol, fs represents a sampling rate, f represents a frequency offset of a time-domain signal, and τ represents a time delay.

A time-frequency joint synchronization method based on an all-phase spectrum-corrected Costas sequence is provided. The method includes, but not limited to, the following steps (1) to (5).

In step (1), the time-domain signal is divided based on the time period T of the symbol to obtain divided signals $x_1(n)$, $x_2(n)$, . . . , and $x_m(n)$. Due to the influence of time delay, a part of information of a symbol may be included in a next divided signal. Taking $x_2(n)$ as an example, if there is no time delay, $x_2(n)$ represents a time-domain waveform of a second symbol, and $x_2(n)$ is expressed as:

$$x_2(n)=A_2 \sin[2\pi f_2(n-\tau)] \quad (1)$$

In the above equation, $A_1$ represents an amplitude of a signal in a time period of a first symbol, $A_2$ represents an amplitude of the signal in a time period of a second symbol, n is a time discrete identification, τ represents the time delay, $f_1$ represents a frequency of a symbol 1, and $f_2$ represents a frequency of a symbol 2. FFT is now performed on $x_2(n)$. The spectrum leakage generated by the frequency $f_1$ does not affect subsequent estimations. In a case that there is a time delay, a part of the information of the first symbol may be delayed into $x_2(n)$, which is expressed as:

$$x_2(n)=A_1 \sin[2\pi f_1(n-\tau)]+A_2 \sin[2\pi f_2(n-\tau)] \quad (2)$$

Figure 3:
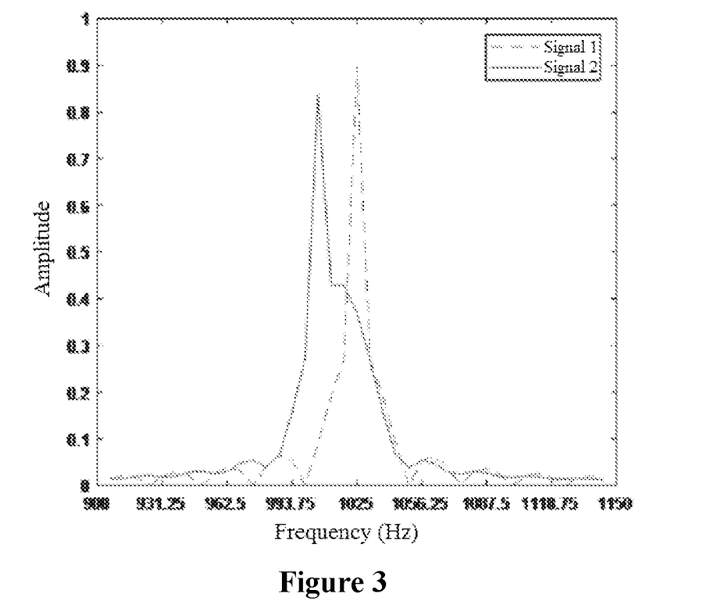
FIG. 3 is a schematic diagram illustrating an effect of spectrum leakage.

After Fourier transform FFT is performed on $x_2(n)$, the spectrum leakage caused by the frequency $f_1$ may greatly interfere with the spectrum line of the main lobe of the frequency $f_1$, as shown in FIG. 3. The interference may seriously affect the subsequent discrete spectrum correction process.

In order to minimize the problem of the spectrum correction caused by the spectrum leakage, in the embodiment, the signal is processed (mainly including signal conversion, window function weighting and the like, which are described below) before FFT, and the conventional FFT is replaced by the all-phase Fourier transform apFFT, thereby reducing the impact of spectrum leakage. Detailed descriptions are provided as follows.

In step (2), the divided signals are inverted and then are spliced with the original signal to obtain a new signal $x_i(2n-1)$, the signal $x_i(2n-1)$ is weighted by using a convolution window we, and data with an interval of N are overlapped and added. N represents the number of data points of the divided signals $x_i(n)$. $w_c$ represents a convolution of a front window $g_1(n)$ having a length of n and an inverted rear window $g_2(n)$.

$$w_c(n)=g_1(n)*g_2(-n) \quad (3)$$

Then, the data with the interval of N are overlapped and added, and then are added with a window function R(n) to obtain a signal $y_i(n)$. $y_i(n)$ is expressed as:

$$y_i(n)=[w_c(n)x_i(n)+w_c(n-N)x_i(n-N)]R(n) \quad (4)$$

In step (3), DFT is performed on the $y_i(n)$ obtained in step (2), thus the all-phase Fourier transform is performed on the divided signals $x_i(n)$. Then, modulus calculation is performed based on the signal. $Y_i(W)$ is defined as the all-phase Fourier transform of the signal $x_i(n)$, then the spectrum of $x_i(n)$ represents a modulus value of $Y_i(W)$, which is expressed as:

$$x_i(n) \rightarrow |Y_i(W)|^2 \quad (5)$$

where the arrow represents that $|X_i(W)|^2$ and $|Y_i(W)|^2$ are frequency-domain mappings of the time-domain signal $x_i(n)$.

The spectrums $|Y_1(W)|^2$ to $|Y_m(W)|^2$ of the divided signals $x_i(n)$ are combined into a time-frequency spectrum to obtain the combined time-frequency spectrum, and the combined time-frequency spectrum is expressed by using a time-frequency matrix. Then, the time-frequency spectrum of the time-frequency signal x(n) is expressed as:

$$x(n) \Rightarrow [|Y_1(W)|^2, |Y_2(W)|^2, \ldots, |Y_m(W)|^2] \quad (6)$$

where the double arrow represents a time-frequency domain mapping of the signal x(n), and the time-frequency domain mapping is in a form of matrix.

Then, sliding synchronization is performed on a local Costas sequence to obtain a peak Max of a two-dimensional autocorrelation function. The coordinates of the peak are ($t_{es}$, $f_{es}$), where $t_{es}$ represents a coarse time delay estimation value, and $f_{es}$ represents a coarse frequency estimation value.

In step (4), since the resolution of the coarse time delay estimation value $t_{es}$ is the same as the resolution of the time period T of the symbol in step (1), a spectrum $|Y_i(W)|^2$ of a symbol in the time-frequency spectrum of x(n) may be obtained based on $t_{es}$. $f_{es}$ represents the peak of the spectrum $|Y_i(W)|^2$ of the symbol, and the spectrum is shown in FIG. 4. Due to the influence of the frequency offset f, if x represents a position of a peak of the spectrum after apFFT transformation, $x_0$ represents a position of a real peak of the spectrum. In a case that the window function in FIG. 1 is a rectangular window, the power spectrum function $Y_i(x)$ may be expressed as:

$$Y_i(x) = A \frac{\sin^2[\pi(x-x_0)]}{\pi^2(x-x_0)^2} \quad (7)$$

Based on the gravity-center algorithm, in a case that n→∞:

$$\sum_{j=-n}^{n} Y_i(j) \cdot (x - x_0 + j) = 0 \quad (8)$$

In the above equation, n represents half the number of spectrum lines in the main lobe of the spectrum. Based on equations (7) and (8), coordinates of the position $x_0$ of the actual peak of the spectral function may be calculated by using the following equation:

$$x_0 = \frac{\sum_{j=-n}^{n} Y_i(j) \cdot (x+j)}{\sum_{j=-n}^{n} Y_i(j)} \quad (9)$$

It is assumed that fs represents the sampling frequency, N represents the number of FFT points, and k represents coordinates of a peak of a spectrum line, then an frequency offset estimation value is calculated by using the following equation:

$$\Delta f = \frac{\sum_{j=-n}^{n} Y_i(k+j) \cdot f_s/N}{\sum_{j=-n}^{n} Y_i(j)} \quad (10)$$

Figure 5:
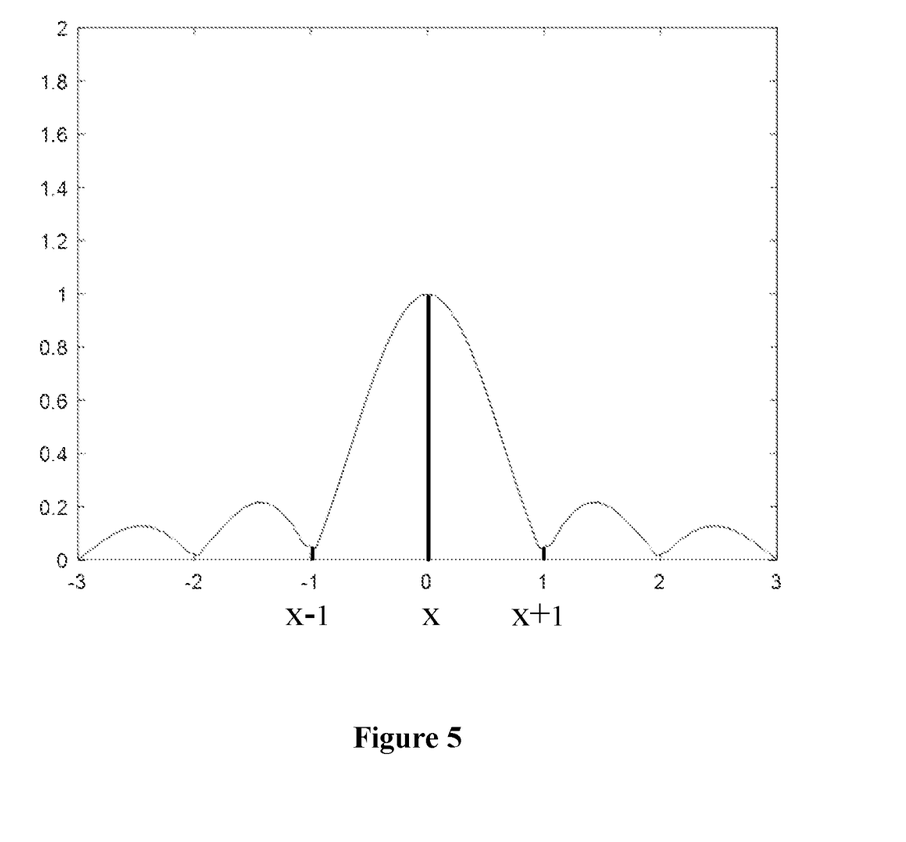
FIG. 5 is a schematic diagram 2 showing discrete spectrum correction according to another embodiment of the present disclosure.

It can be seen that the accuracy of the estimated Δf is limited by $f_s/N$, that is, is limited by the spectrum resolution. The conventional time-frequency joint synchronization method based on a Costas sequence is based on a short-time Fourier transform, and the spectrum resolution is generally improved by performing oversampling operation, resulting in an increased value of N in an equation and thereby reducing the anti-noise performance of the method. In addition, in a case that an actual frequency offset f is an integer multiple (which may be 0, that is, no frequency offset) of the spectrum resolution, a large error occurs. As shown in FIG. 5, in a case that there is no frequency offset and no noise interference, the spectrum line at the position x, that is, at the peak, is a correct frequency position, the spectrum line of the peak has a value of 0 respectively at positions x−1 and x+1, and a correct frequency offset may be calculated by using the equation (10). However, due to the interference of noise, the values at the positions of x−1 and x+1 are not 0, resulting in a large error in calculation by using the equation (10).

In step (5), the error in the step (4) is avoided by performing the processes shown in FIG. 2. After receiving a time-domain signal, the receiver performs processes shown in FIG. 2. In a case that the frequency offset, as described in step (4), is an integer multiple (which may be 0, that is, no frequency offset) of the spectrum resolution, a frequency offset value Δf with a large error may be obtained by using the equation (6). Therefore, in the embodiment, frequency offset correction and time delay correction (the time delay correction is performed based on $t_{es}$) are performed on the signal by using the following correction equation:

$$x(n) = x(n + t_{es}) \cdot e^{-j2\pi \Delta ft} \quad (11)$$

In the above equation, x(n) represents the time-domain signal in FIG. 1. After performing calculation based on the above equation (11), the frequency offset of the time-domain signal is equal f−Δf, and the time delay of the time-domain signal is equal to τ−$t_{es}$. The probability that the frequency offset f−Δf is still at the certain position shown in FIG. 5 is be greatly reduced. Then, proceed to step (1), and a Max value in the current iteration is obtained in step (3). The Max value is defined as $Max_i$, where i represents the number of iterations and is greater than 1. $Max_i$ with $Max_{i-1}$ are compared, and it is determined based on the following equations.

$$\begin{cases} Max_i > Max_{i-1} & \text{perform iteration} \\ Max_i <= Max_{i-1} & \text{stop iteration} \end{cases} \quad (12)$$

In a case that $Max_i > Max_{i-1}$, it indicates that the position of the spectrum line of the peak in the current iteration is closer to a position of a spectrum line of a real peak than the position of the spectrum line of the peak in the previous iteration, and the energy of the peak in the current iteration is larger than the energy of the peak in the previous iteration, that is, a positive effect is achieved by performing the frequency offset correction. Therefore, the subsequent steps are performed until step (5). In a case that $Max_i <= Max_{i-1}$, it indicates that the position of the spectrum line of the peak in the current iteration is farther away from a position of a spectrum line of a real peak than the position of the spectrum line of the peak in the previous iteration, and the energy of the peak in the current iteration is less than the energy of the peak in the previous iteration, that is, a negative effect is achieved by performing the frequency offset correction. Therefore, the iteration should be stopped in time to prevent achieving a positive effect in the next iteration and prevent infinite iteration to a maximum iteration number. The influence of time delay τ−$t_{es}$ on $Max_i$ is the same as the influence of frequency offset f−Δf on $Max_i$. Therefore, in the case that $Max_i <= Max_{i-1}$, the iteration is stopped, and the time delay estimation value $t_{es}$ obtained in step (3) in the previous iteration and the frequency offset estimation value Δf obtained in step (4) in the previous iteration are outputted as a final estimation result.

In describing the embodiments of the present disclosure, terms "comprising", "including" and "having" are inclusive and mean that there may be other steps in addition to the listed steps.

It should be noted that those skilled in the art can understand that all or part of the processes in the method embodiments may be implemented by instructing relevant hardware through a computer program. The program may be stored in a computer-readable storage medium. The program, when being executed, may include the processes in the method embodiments. The storage medium may be a magnetic disk, an optical disk, a read-only memory (ROM), a random access memory (RAM), or the like.

The above are only specific implementations of the present disclosure, and it should be noted that those skilled in the art can understand that various changes, modifications, replacements and variations may be made to these embodiments without departing from the principle and spirit of the present disclosure. The scope of the disclosure is defined by the appended claims and their equivalents.

The invention claimed is:

1. A time-frequency joint synchronization method based on an all-phase spectrum-corrected Costas sequence, comprising:

S1, dividing, by a receiver after receiving a time-domain signal x(N), the time-domain signal x(N) to obtain divided signals $x_1(n)$, $x_2(n)$, ..., and $x_m(n)$ based on a time period of a symbol, wherein the divided signals are represented by $x_i(n)$, i=1, 2, ..., m, and m represents the number of the divided signals;

S2, inverting the $x_i(n)$, windowing the inverted $x_i(n)$, performing an all-phase Fourier transform apFFT on the windowed $x_i(n)$ to obtain all-phase Fourier transforms $X_1(W)$ to $X_m(W)$ of the divided signals $x_i(n)$, and performing modulus calculation to obtain spectrums $|X_1(W)|^2$ to $|X_m(W)|^2$ of the divided signals $x_i(n)$, wherein the spectrums are represented by $|X_i(W)|^2$;

S3, combining the spectrums $|X_1(W)|^2$ to $|X_m(W)|^2$ of the divided signals into a time-frequency spectrum, and expressing the combined time-frequency spectrum as a time-frequency matrix;

S4, performing sliding autocorrelation on a local Costas sequence based on the time-frequency matrix by using a sliding window algorithm to obtain a two-dimensional autocorrelation function, obtaining a coarse synchronization result based on coordinates of a peak of the autocorrelation function, and correcting a discrete spectrum after all-phase Fourier transform based on a coarse estimation value to obtain a time delay estimation value and a frequency offset estimation value;

S5, determining whether an amplitude of the peak of the two-dimensional autocorrelation function in the S4 is decreased compared with an amplitude of a peak of a two-dimensional autocorrelation function in S4 in a previous iteration or whether the number of iterations reaches a maximum limit, outputting a time delay estimation value and a frequency offset estimation value in the S4 in the previous iteration as an output result of the method in a case that the amplitude of the peak of the two-dimensional autocorrelation function is decreased or the number of the iterations reaches the maximum limit, and increasing the number of iterations by one and proceeding to S6 in a case that the amplitude of the peak of the two-dimensional autocorrelation function is not decreased; and S6, performing time delay correction and frequency offset correction on the time-domain signal x(N) in S1 by using the time delay estimation value and the frequency offset estimation value obtained in S4 as correction values to obtain a corrected time-domain signal x(N), and proceeding to S1.

2. The time-frequency joint synchronization method based on an all-phase spectrum-corrected Costas sequence according to claim 1, wherein S4 comprises:

S41, performing two-dimensional autocorrelation on the local Costas sequence based on the time-frequency matrix obtained in S3 to obtain the two-dimensional autocorrelation function, determining an abscissa of the peak of the two-dimensional autocorrelation function as a coarse time delay estimation value, and determining an ordinate of the peak as a coarse frequency offset estimation value; and S42, based on the coarse time delay estimation value, performing discrete spectrum analysis on a spectrum in a time period of a symbol corresponding to the coarse time delay estimation value to obtain coordinates of a peak of the spectrum, and performing coarse frequency estimation by using a gravity-center algorithm and a main lobe function expression of a used window function to obtain the time delay estimation value and the frequency offset estimation value.

3. The time-frequency joint synchronization method based on an all-phase spectrum-corrected Costas sequence according to claim 1, wherein the time delay correction and the frequency offset correction are performed on the time-domain signal x(N) in S6 by using the following correction equation:

$$x(n)=x(n+t_{es})\cdot e^{-j2\pi\Delta ft}$$

where x(n) represents the corrected time-domain signal, $t_{es}$ represents a coarse time delay estimation value, and $\Delta f$ represents the frequency offset estimation value.

* * * * *